United States Patent
Huang et al.

(10) Patent No.: US 7,644,105 B2
(45) Date of Patent: Jan. 5, 2010

(54) SYSTEMS AND METHODS FOR STRUCTURED VARIABLE RESOLUTION INFORMATION DISSEMINATION AND DISCOVERY

(75) Inventors: Qingfeng Huang, San Jose, CA (US); Ying Zhang, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 219 days.

(21) Appl. No.: 11/594,362

(22) Filed: Nov. 8, 2006

(65) Prior Publication Data
US 2008/0109456 A1 May 8, 2008

(51) Int. Cl.
G06F 7/00 (2006.01)
G06F 17/00 (2006.01)
G06F 17/30 (2006.01)
G06F 15/16 (2006.01)
G06F 15/173 (2006.01)

(52) U.S. Cl. .................. 707/104.1; 707/3; 707/10; 709/202; 709/218; 709/226; 709/239

(58) Field of Classification Search .............. 707/3, 707/10, 104.1; 709/202, 218, 226, 239
See application file for complete search history.

(56) References Cited

U.S. PATENT DOCUMENTS 5,590,250 A * 12/1996 Lamping et al. ............. 345/427
6,744,740 B2 * 6/2004 Chen ........................... 370/255
7,177,295 B1 * 2/2007 Sholander et al. ............ 370/338
7,254,608 B2 * 8/2007 Yeager et al. ................. 709/203
2004/0032847 A1 * 2/2004 Cain ............................ 370/338
2004/0246911 A1 * 12/2004 Bonsma et al. .............. 370/254
2005/0228628 A1 * 10/2005 Bellantoni et al. ............. 703/13

OTHER PUBLICATIONS

Ghosh, A.; Greene, D.; Huang, Q; Liu, J., "Variable Resolution Information Dissemination", SenSys '04, Nov. 3-5, 2004, Baltimore, MD, ACM, 2004.
Liu, X.; Huang, Q.: Zhang, Y., "Combs, Needles, Haystack: Balancing Push and Pull for Discovery ion Large-Scale Sensor Networks", in Proceedings of the 2nd International Conference on Embedded Networked Sensor Systems (SenSys 04); Nov. 3-6, 2004; Baltimore; MD. NY; ACM; 2004; 122-133.

* cited by examiner

*Primary Examiner*—James Trujillo
*Assistant Examiner*—Jorge A Casanova
(74) *Attorney, Agent, or Firm*—Park, Vaughan & Fleming LLP (57) ABSTRACT

Techniques are provided for efficient information dissemination and discovery in large scale networks such as ad-hoc networks, sensor networks, vehicle networks, virtual networks and the like. The spatial information for a plurality of network elements within a network is determined and an interesting node identified. A variable resolution communication structure of inter-connected nodes is determined based on spatial information for the interesting node and a map. The map may be based on an equation, a formula, coordinates or other methods of extensibly specifying spaces. Information about the interesting node is propagated via the inter-connected nodes of the variable resolution communication structure.

20 Claims, 13 Drawing Sheets

| NODE IDENTIFIER (410) | LATITUDE (420) | LONGITUDE (430) |
|---|---|---|
| 1 | 71.30N | 156.78W |
| 2 | 61.17N | 150.02W |
| 3 | 60.78N | 161.80W |
| 4 | 55.20N | 162.73W |
| 5 | 64.82N | 147.87W |
| . | . | . |
| . | . | . |
| . | . | . |
| N | 58.37N | 134.58W |

|   | 1 | 2 | 3 | 4 | 5 | 6 |
|---|---|---|---|---|---|---|
| 1 | - | 1 | 0 | 0 | 0 | 1 |
| 2 |   | - | 1 | 0 | 0 | 1 |
| 3 |   |   | - | 1 | 0 | 0 |
| 4 |   |   |   | - | 1 | 1 |
| 5 |   |   |   |   | - | 1 |
| 6 |   |   |   |   |   | - |

| NODE IDENTIFIER (610) | TEMPERATURE (F) (620) | HUMIDITY (%) (630) | POWER (HRS) (640) |
|---|---|---|---|
| 1 | 27 | 81 | 24 |
| 2 | 7 | 84 | 1 |
| 3 | 30 | 85 | 23 |
| 4 | 22 | 79 | 18 |
| 5 | 25 | 80 | 19 |
| . | . | . | . |
| . | . | . | . |
| . | . | . | . |
| N | 31 | 81 | 48 |

SYSTEMS AND METHODS FOR STRUCTURED VARIABLE RESOLUTION INFORMATION DISSEMINATION AND DISCOVERY

BACKGROUND OF THE INVENTION

1. Field of Invention

This invention relates to information access.

2. Description of Related Art

Conventional network information systems allow information from nodes of interest to be sampled by a query node. Responding to a query consumes network bandwidth, power and other resources. As the number of nodes in the network increases, resources consumed in responding to a query tend to increase based on the number of nodes in the network. The process is repeated as the requested information from the interesting node traverses the network on its return to the query node. These inefficiencies consume scarce network resources and delay the information transfer between information producers and information consumers.

SUMMARY

The systems and methods according to this invention provide for efficient information dissemination and discovery in large scale networks such as ad-hoc networks, sensor networks, vehicle networks, virtual networks and the like. The spatial information for a plurality of network elements within a network is determined and an interesting node identified. A variable resolution communication structure of inter-connected nodes is determined based on spatial information for the interesting node and a map. The map may be based on an equation, a formula, coordinates or other methods of extensibly specifying spaces. Information about the interesting node is propagated via the inter-connected nodes of the variable resolution communication structure.

DETAILED DESCRIPTION OF EXEMPLARY EMBODIMENTS

Figure 1:
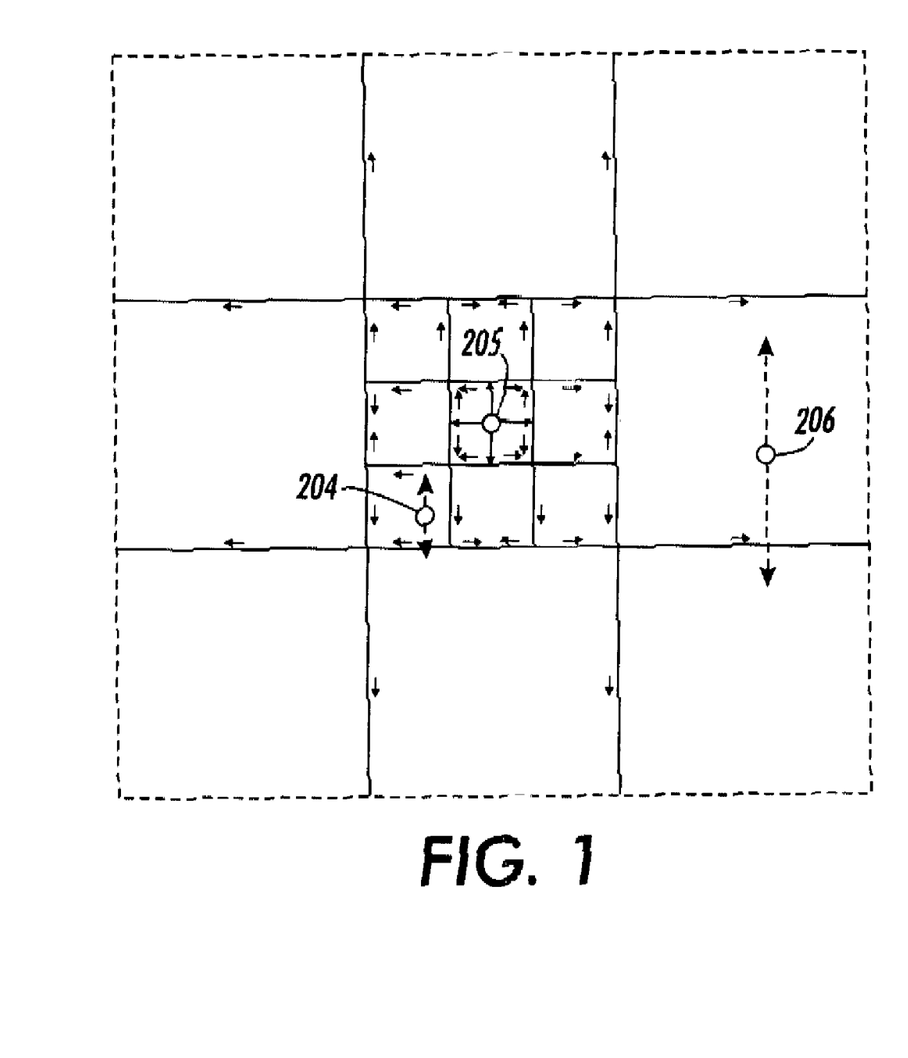
FIG. 1 is an overview of an exemplary variable communication structure according to this invention.

FIG. 1 is an overview of an exemplary variable communication structure according to this invention. A variable resolution communication structure surrounds the interesting node 205 in a network of inter-connected nodes. A first query-initiating node 206 initiates a request for the interesting information available from interesting node 205. The first query-initiating node 206 lies some distance away from the interesting node 205. The number of conduits within the variable resolution communication structure available to supply interesting information decreases with distance from the interesting node. This variable resolution communication structure reduces bandwidth usage, conserves battery power and helps conserve other resources within the network. The first query-initiating node 206 obtains access to the information from the interesting node 205 via the conduits within the variable resolution communication structure as indicated by the rectangle surrounding the first query-initiating node 206. The decreasing density of the variable resolution communication structure decreases the number of messages carried over the network from order $O(n)$ to order $O(\sqrt{n})$.

The portion of the network surrounding the second query-initiating node 204 is served by a larger number of conduits within the variable resolution communication structure. Thus, a query for information from the second query-initiating node 204 is likely to be mediated by additional nodes before encountering a node within the variable resolution communication structure.

Figure 2:
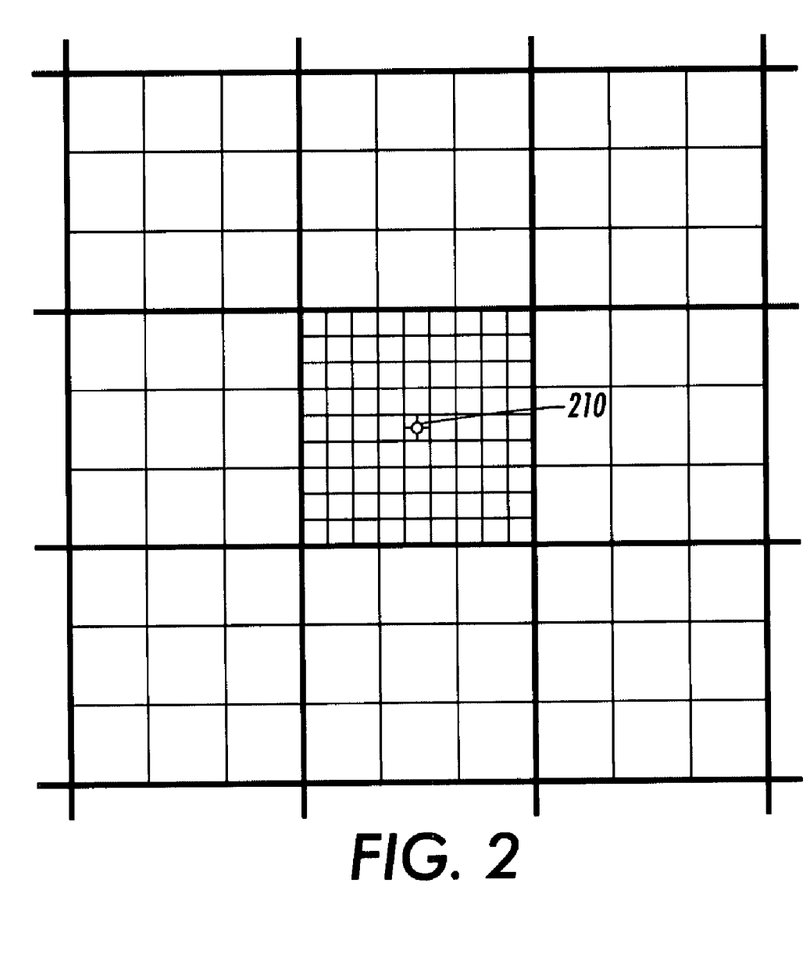
FIG. 2 is an overview of another variable resolution communication information structure according to this invention.

FIG. 2 is an overview of another variable resolution communication information structure according to this invention. The variable resolution communication structure is centered at the interesting node 210. The rectangle surrounding the interesting node is more densely packed with the conduits which form part of the variable resolution communication structure. This high density set of conduits within the variable resolution communication structure provide access to the interesting information with little lag time since the information is unlikely to travel over nodes outside the variable resolution communication structure. The rectangles around the surrounding rectangle are filled with fewer information conduits. That is, the density of the variable communications structure over these areas is reduced. This permits reductions in bandwidth, power and other constrained resources while still maintaining the availability of the requested information within the network.

Figure 3:
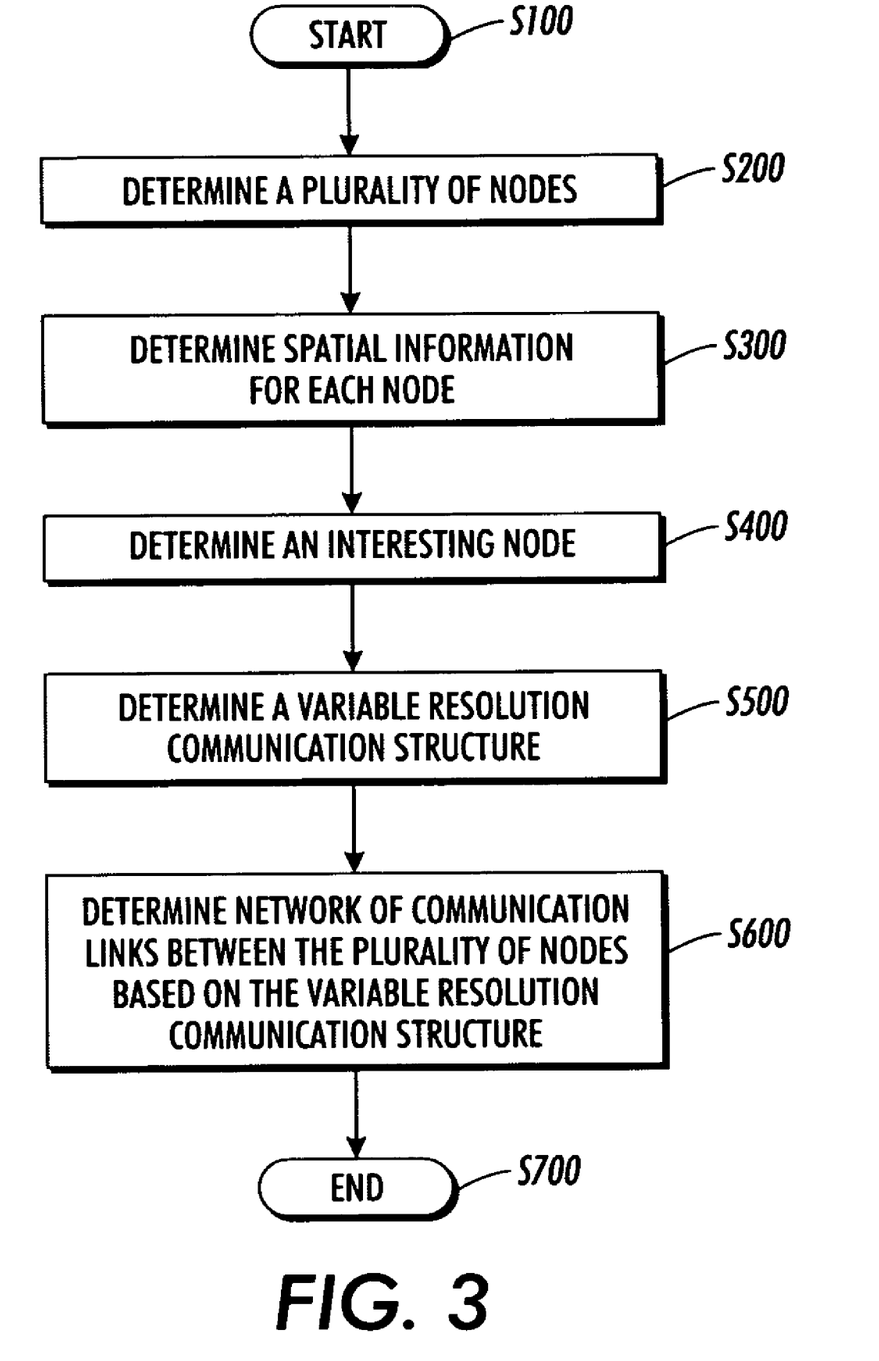
FIG. 3 is flowchart of an exemplary method for structured variable resolution information dissemination and discovery according to this invention.

FIG. 3 is flowchart of an exemplary method for structured variable resolution information dissemination and discovery according to this invention. The process begins at step S100 and immediately continues to step S200.

In step S200, a plurality of inter-connected nodes are determined. The plurality of inter-connected nodes may be the nodes of an ad-hoc network, a wired or wireless network, a fixed line network, a virtual network or any other set of inter-connected nodes. After a plurality of nodes have been determined, control continues to step S300.

The spatial information for each node is determined in step S300. The spatial information may be absolute or relative to a known spatial point or marker. For example, in one exemplary embodiment according to this invention, Global Positioning System (GPS) information is used to provide latitude and longitude information. However, it will be apparent that various other spatial coordinates or references may also be used without departing from the spirit or scope of this invention. After the spatial information for the nodes has been determined, control continues to step S400.

In step S400, one or more interesting nodes are determined. In one exemplary embodiment, an interesting node is associated with information of potential interest elsewhere within the network. For example, interesting nodes might be nodes associated with specific sensor values, sensed values that exceed a threshold value, a sensor at or near a point of interest or which satisfies other query constraints. After the one or more interesting nodes have been determined, control continues to step S500.

A variable resolution communication structure is determined based on a formula in step S500. In one exemplary embodiment, a map defining a variable resolution communication structure is communicated to each node in the network. In other embodiments, the map is communicated by a formula defining a variable resolution communication structure surrounding the interesting node. When a node determines that it is an interesting node, it shares its location information with the other nodes in the network. Control then continues to step S600.

In step S600, each node that receives the location of the interesting node determines whether to create a logical routing or communication links to neighboring nodes based on its own determined spatial location within the variable resolution communication structure. After the communication links have been determined, control then continues to step S700 and the process ends. The resultant variable resolution communication structure provides information conduits to other nodes within the network. It will be apparent that the variable resolution communication structure can be determined before information dissemination or determined dynamically as the message propagates through the network.

Figure 4:
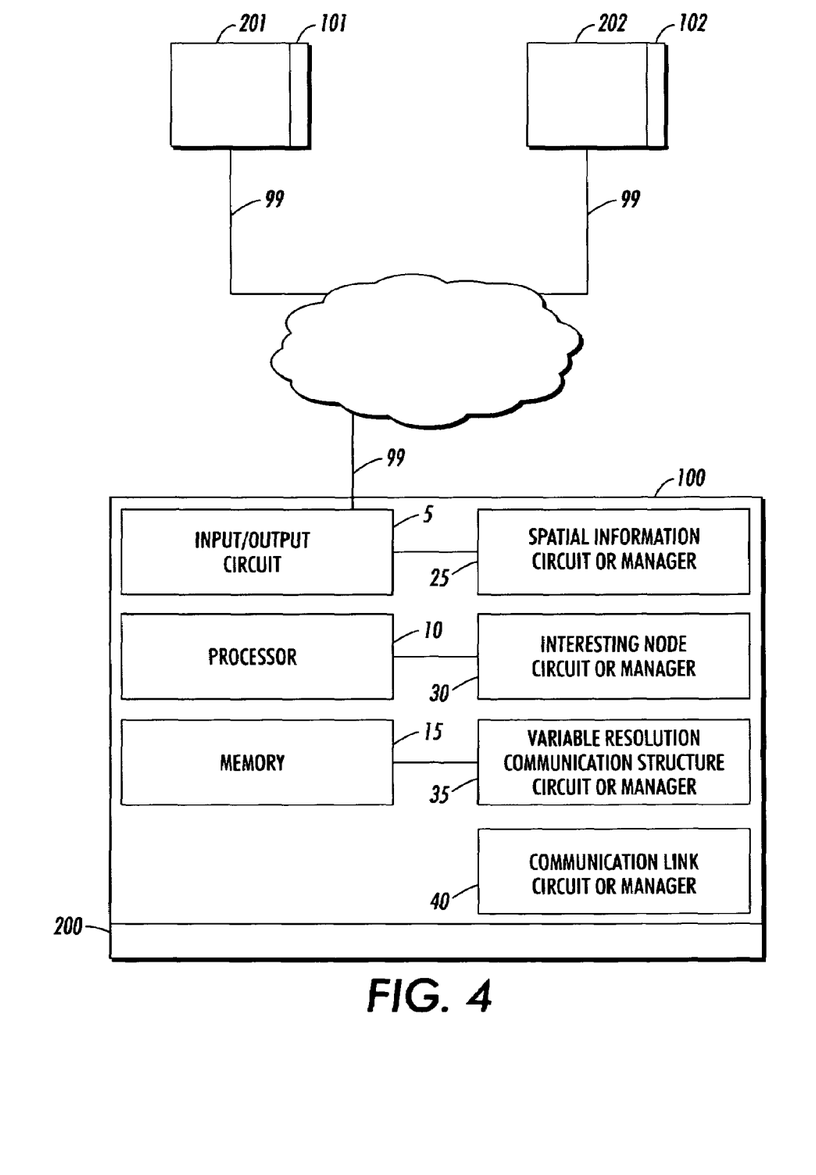
FIG. 4 is an overview of several exemplary interconnected systems for structured variable resolution information dissemination and discovery 100 embedded within networked devices according to this invention.

FIG. 4 is an overview of several exemplary interconnected systems for structured variable resolution information dissemination and discovery 100 embedded within networked devices according to this invention. A first system for structured variable resolution information dissemination and discovery 100 is embedded within a first network element 200 connected to communication links 99. The network element may be a communication node, or other communication-enabled device.

A second first system for structured variable resolution information dissemination and discovery 101 is embedded within network element 201 and connected via communications links 99. A third system for structured variable resolution information dissemination and discovery 102 is similarly embedded within network element 202 and connected via communications links 99. Additional elements in the network are omitted for clarity.

The spatial information circuit or manager 25 is activated to determine spatial information about the node. In one exemplary embodiment, latitude and longitude information describing the nodes position is retrieved from embedded or external global position circuits (not shown). The latitude and longitude information is then stored in memory 15. It should be apparent that various types of spatial information can be used to describe the absolute or relative spatial location of a node without departing from the spirit or scope of this invention.

The input/output circuit 5 is activated to retrieve a variable resolution communication structure map. The map may be encoded in a formula, a series of coordinates such as polygons or using various other means of extensibly defining structures based on spatial information. In some embodiments each node is pre-initialized with the map information.

The interesting node circuit or manager 30 is activated to determine if the node is an interesting node. In some exemplary embodiments according to this invention, the nodes may be self monitoring nodes. Thus, a threshold or range may be pre-loaded and nodes that satisfy the criteria identify themselves as interesting nodes. For example, a battery powered node which is unable to hold a power charge from a recharging unit may identify itself as an interesting node. Conversely, a node may identify itself as an interesting node based on a query. For example, nodes stationed at the North Pole would identify themselves as interesting nodes in response to a query for a node at a latitude>60. The interesting node circuit or manager 30 identifies the relevant nodes. In some embodiments, nodes may be associated with temporal constraints. Thus, a node may determine that it is an interesting node at any time within temporal ranges specified by the query.

The variable resolution communication structure circuit or manager 35 is activated to determine a variable communication structure surrounding the interesting node. In some embodiments, multiple interesting nodes in close proximity are merged and treated as a single node for the purpose of constructing a variable resolution communication structure.

The variable resolution communication structure reduces the density of communicating nodes that carry information about the interesting nodes as distance from the one or more interesting nodes increases. In various embodiments, the variable resolution communication structure may be defined so as to balance the need for information from an interesting node while also ensuring efficient use of bandwidth, battery and/or other resources within the network of nodes.

The communication link circuit or manager 40 is then activated to connect nodes defined by the variable resolution communication structure. The communication link circuit or manager determines a nodes membership in the set of nodes forming the variable resolution communication structure based on the node's spatial information, the spatial information of the one or more interesting nodes and the extensible variable resolution communication structure map. In some embodiments according to this invention the map is a formula defining the variable resolution communication structure. If the calculation indicates the node is a member of the variable resolution communication structure, the node will establish communication links with neighboring nodes within the variable resolution communication structure. For example, links may be established with neighboring nodes in the variable resolution communication structure by examining a routing table. In various embodiments, the location of each node in the network is shared at regular update intervals. Thus, a given node can readily identify the nodes to which it is connected and, with their spatial information, it can select connected nodes that are in the variable resolution communication structure.

Figure 5:
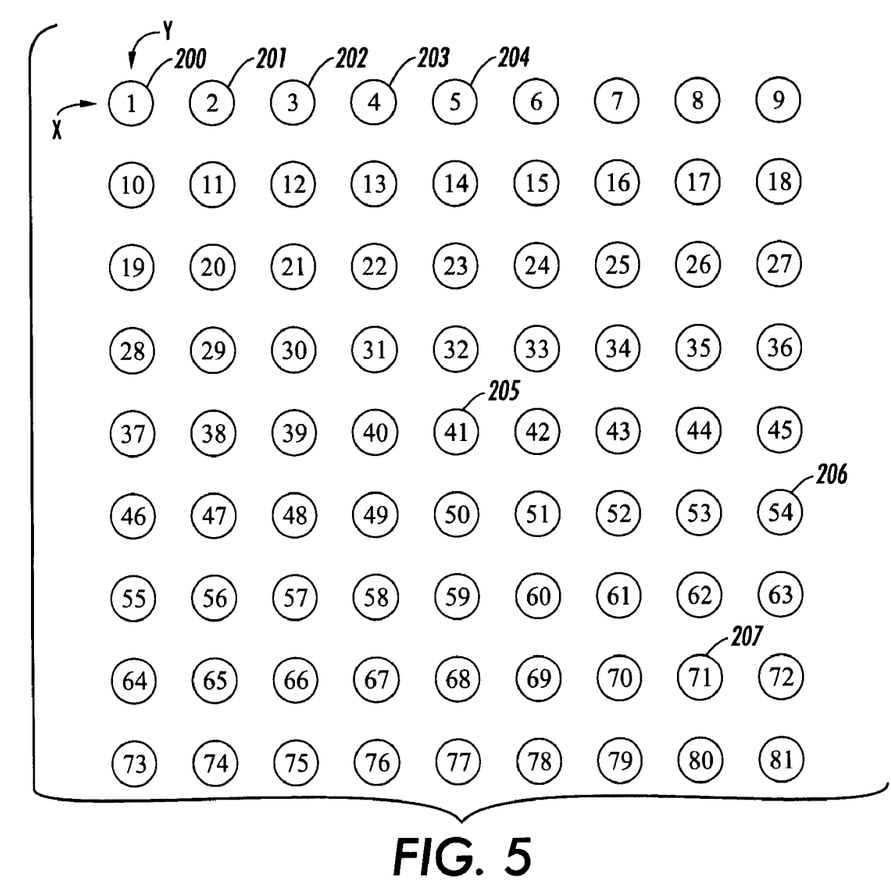
FIG. 5 is an overview of an exemplary network of elements or nodes.

FIG. 5 is an overview of an exemplary network of elements or nodes. Each element is associated with coordinates X, Y which define the spatial location of each element within the network. For example, element or node 1, 200 is associated with a spatial location of (X=1,Y=1) since it lies within the X column and Y row of the X,Y grid. Similarly, element or node 2, 201 is associated with a spatial location of a (X=2, Y=1). Elements or nodes 3-5, 202-204 are associated with spatial information (X=3, Y=1), (X=4, Y=1), (X=5, Y=1) respectively.

Element or node 41, 205 is associated with spatial information (X=5, Y=5). If node 41, 205 is identified as an interesting node, then nodes in the network identify their membership in a variable resolution communication structure based on the X,Y coordinates and the map. In some embodiments, the map is defined by a formula which when applied to the coordinates of the interesting node and the current node indicate whether the current node is within the set of nodes comprising the variable resolution communication structure.

In other exemplary embodiments according to this invention, the variable resolution communication structure is defined by polygons, or other mathematical or topological structures capable of defining the spaces of an extensible variable resolution communication structure. The space may be defined using a formula, sets of co-ordinates, polygons or the like. For example, polygons surrounding the current node can be used to determine the node's membership within the variable resolution communication structure while the absence of a surrounding polygon indicates the current node is not a node within the variable resolution communication structure.

Figure 6:
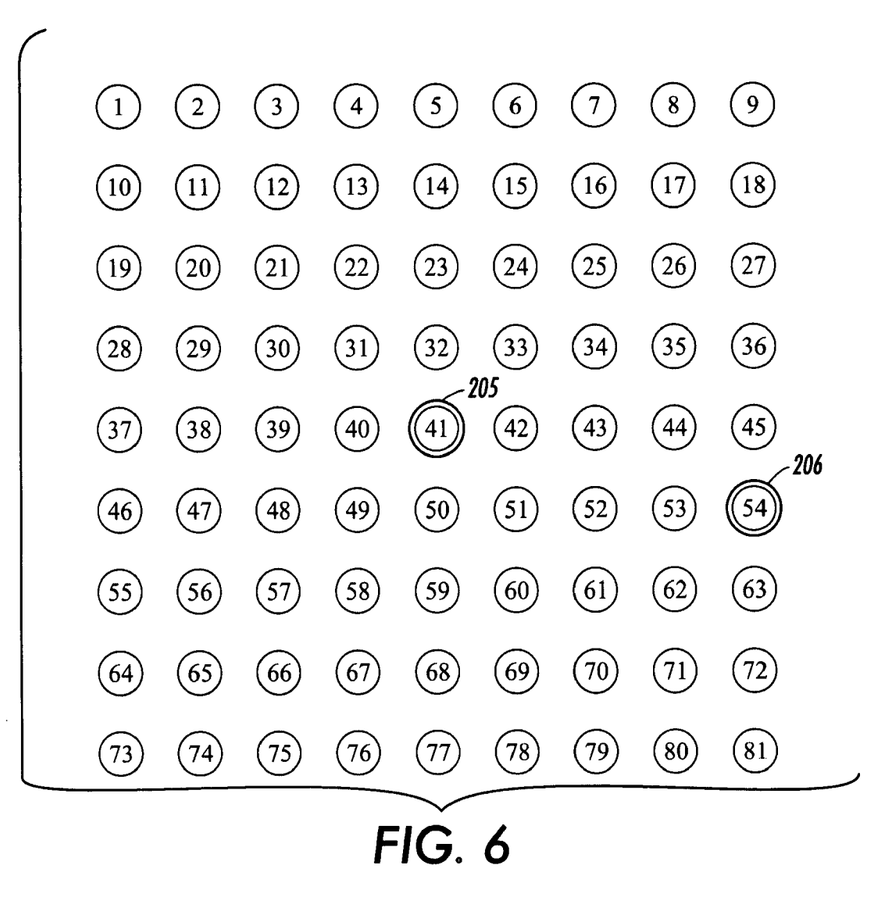
FIG. 6 is an overview of the exemplary network.

FIG. 6 is an overview of the exemplary network. The interesting node 41, 205 is associated with information of interest to the query initiating node 54, 206. Thus, in one exemplary embodiment, a grid based variable resolution communication structure is applied to the network to define the nodes to form communication links that will carry the information. The variable resolution communication structure is defined using a formula, a map, or the like.

Figure 7:
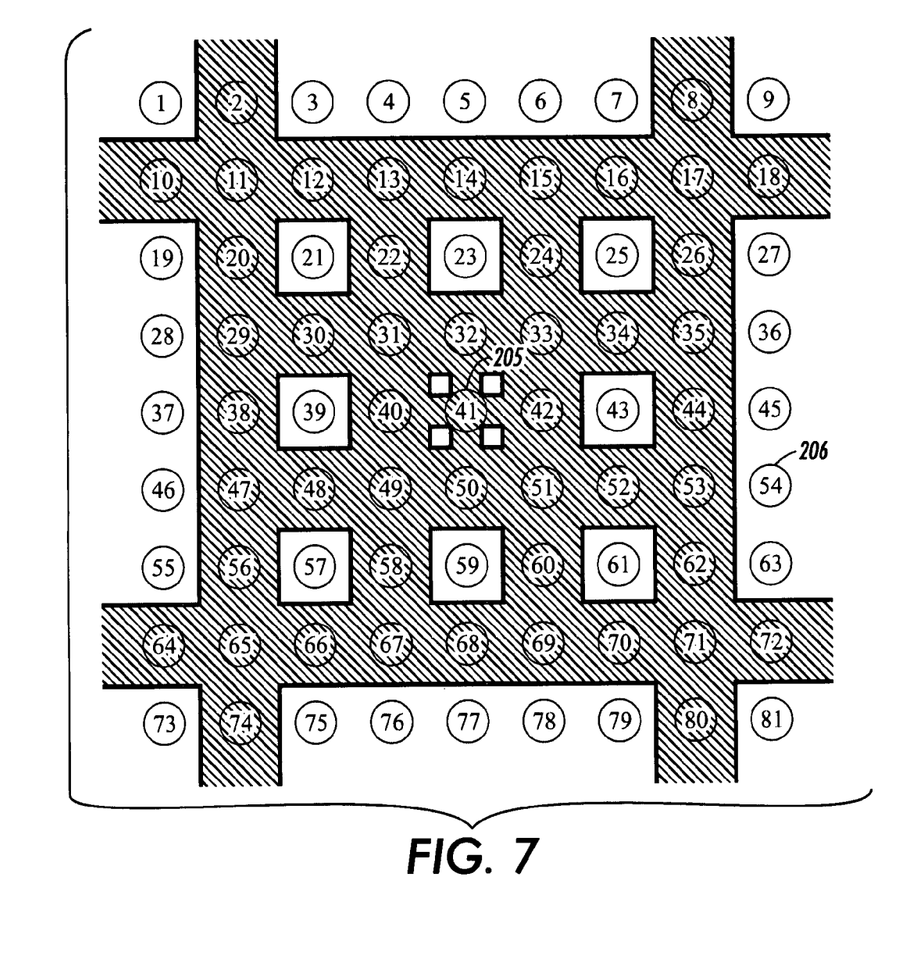
FIG. 7 is an overview showing an exemplary first variable resolution communication structure according to this invention.

FIG. 7 is an overview showing an exemplary first variable resolution communication structure according to this invention. The first variable resolution communication structure is centered on the interesting node 41, 205. Close to the interesting node 41, 205, the variable resolution communication structure provides a large number of nodes over which the interesting information can travel. The density or number of nodes carrying the information from the interesting node decreases with distance from the interesting node 41, 205.

This allows closer nodes to be quickly updated with information from the interesting node 41, 205. Due to the variable resolution in the communication structure, the more distant nodes are more likely to access the information from the interesting node via a mediating node.

For example, query initiating node 54, 206 is not within the set of nodes comprising the first variable resolution communication structure. However, the query initiating node 54, 206 will receive the interesting information from node 53 which lies within the first variable resolution communication structure. The number of nodes in the first variable resolution communication structure that carry the information decreases with distance from the interesting node 41, 205. This reduces the bandwidth, battery power and other demands on network resources while maintaining a quality of service for information dissemination and discovery within the network.

As interesting nodes are identified, additional variable resolution communication structures are determined and applied to the network. The variable resolution communication structure provides some bounding on the time required to access interesting information within the network. One exemplary grid-based variable resolution communication structure reduces the demands on network resources from order O(n) to order O($\sqrt{n}$) where n is the number of nodes in the graph.

Figure 8:
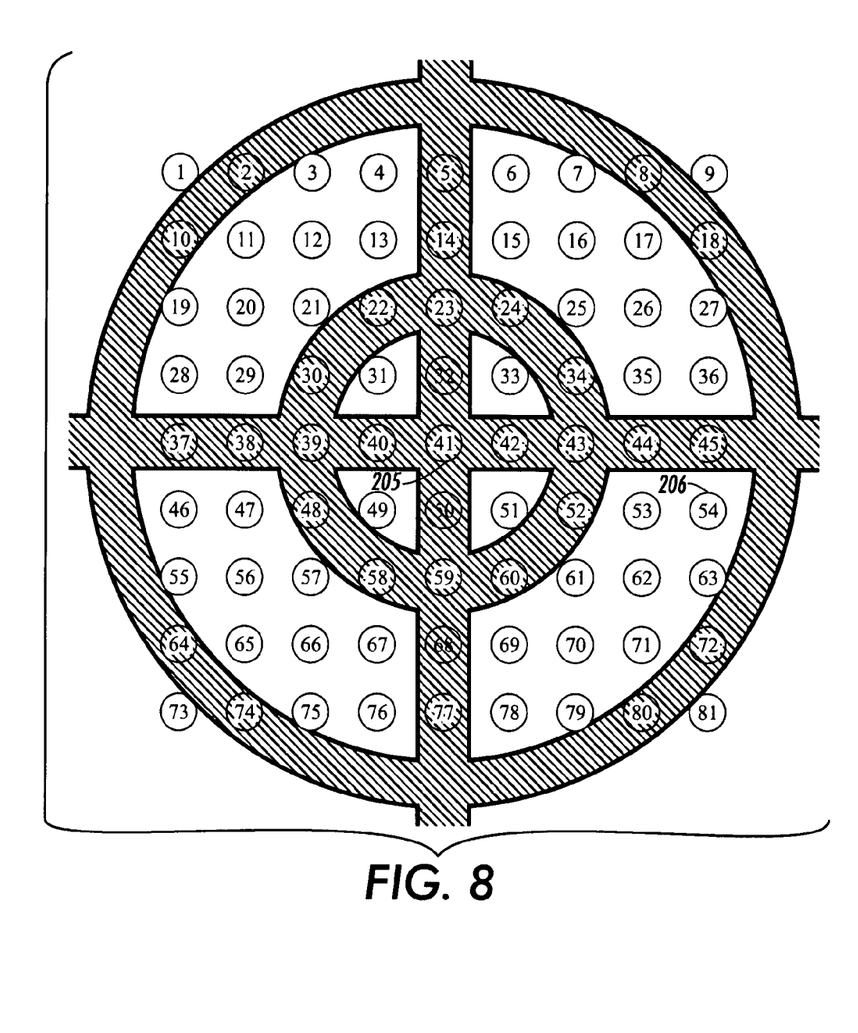
FIG. 8 is an overview showing a second exemplary variable resolution communication structure according to this invention.

FIG. 8 is an overview showing a second exemplary variable resolution communication structure according to this invention. The second variable resolution communication structure is centered at interesting node 41, 205 and comprised of circles or bands of nodes interconnected by arm like sets of nodes. These sets of nodes form conduits that provide access to the interesting information. It will be apparent that the variable resolution communication structure may be extended for larger networks by defining consecutively larger circles or bands connected to extensions of the arms.

The query initiating node 54, 206 is located between the first and second bands and adjacent to arms interconnecting the first and second bands. In one embodiment, the query initiating node 54, 206 receives information from node 45, the closest node within the second variable resolution structure.

It will be apparent that in various other embodiments, the width of a conduit comprising a variable resolution communication structure may be adjusted based on demands of the communication media. For example, the dimensions of the variable resolution communication structure may be adjusted to ensure connectivity over interconnecting conduits that would otherwise not contain a node. Thus, optional transforms may be applied to add connectivity enabling nodes that would otherwise be omitted from a variable resolution communication structure.

Figure 9:
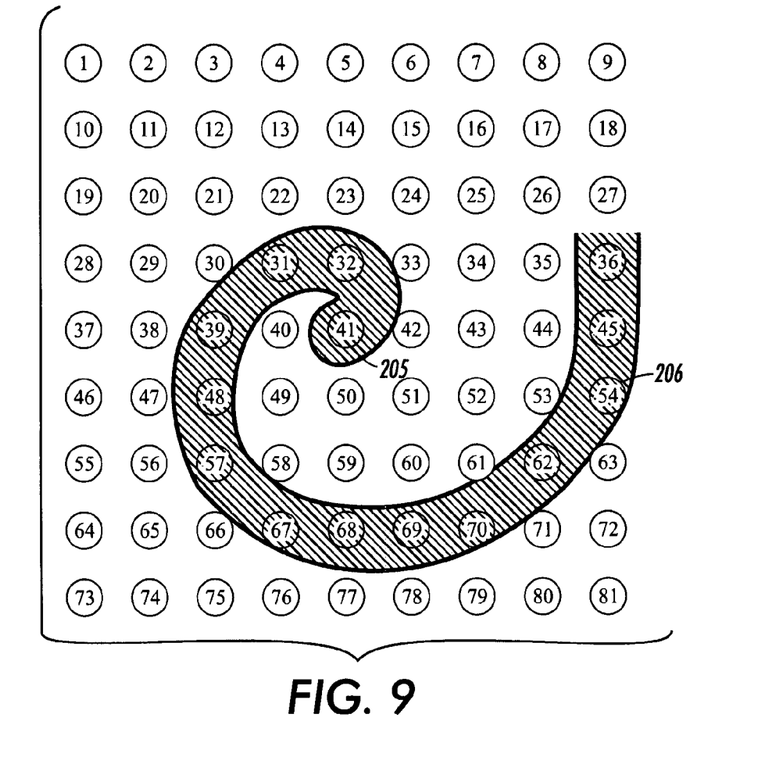
FIG. 9 is an overview showing an exemplary third variable resolution communication structure according to this invention.

FIG. 9 is an overview showing an exemplary third variable resolution communication structure according to this invention. The third variable resolution communication structure is focused around the interesting node 41, 205. The spiral form of the variable resolution communication structure expands from the interesting node 41, 205. The query node 54, 206, lies within the set of nodes forming the variable resolution communication structure. Thus, query initiating node 54, 206 will receive the information from connected node 62 which forms part of the third variable resolution communication structure. The query initiating node 54, 206 does not require any mediating nodes to establish a connection to the variable resolution communication structure. As with other variable communication structures, the connectivity of the spiral type variable communication structure can be transformed to enhance, adjust and/or repair inter-connectivity of the nodes within the variable resolution communication structure.

Figure 10:
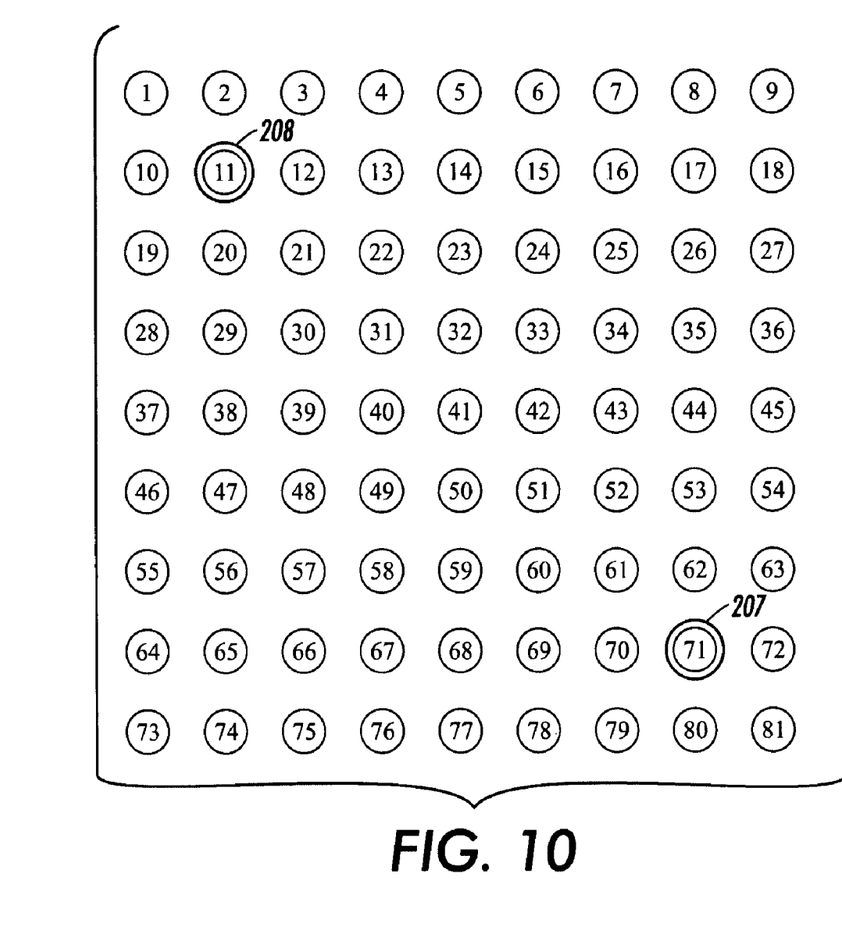
FIG. 10 is an overview of the network showing a second exemplary interesting node and an exemplary query initiating node.

FIG. 10 is an overview of the network showing a second exemplary interesting node 11, 208 and an exemplary query initiating node 71, 207.

Figure 11:
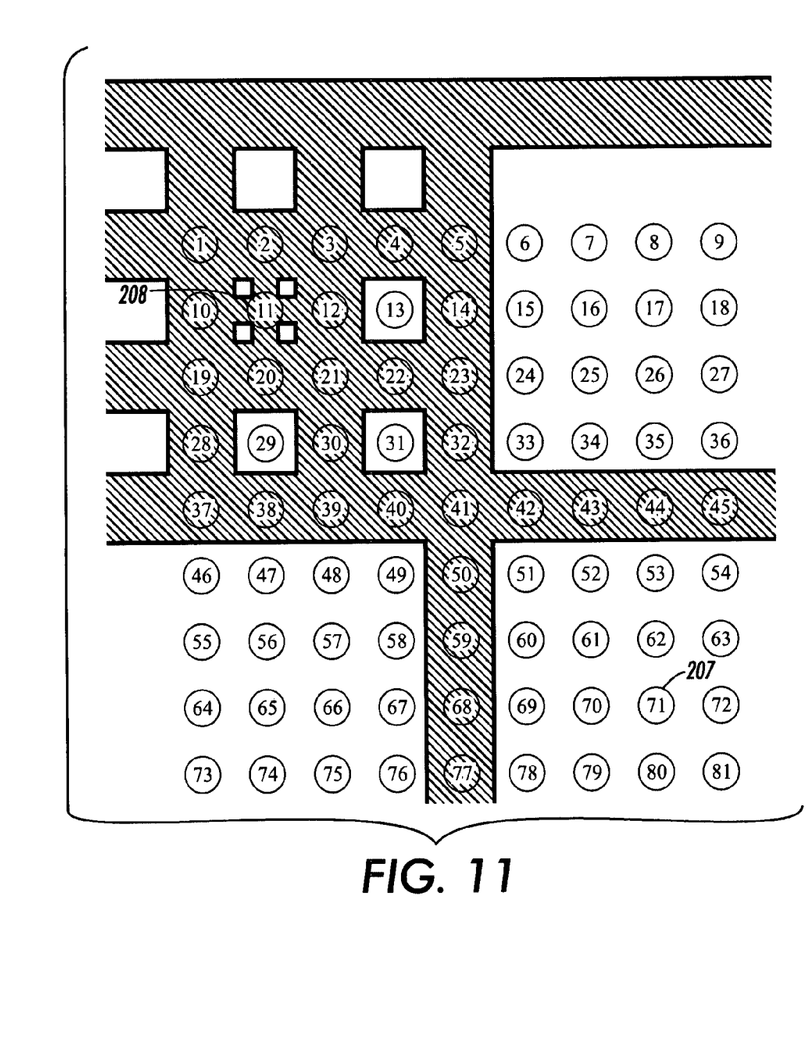
FIG. 11 is an overview showing an exemplary fourth variable resolution communication structure according to this invention.

FIG. 11 is an overview showing an exemplary fourth variable resolution communication structure according to this invention. The fourth variable resolution communication structure is a grid-based structure focused around the second interesting node 11, 208. The fourth variable resolution communication structure defines a set of nodes in the form of parallel and perpendicular conduits. The density of the nodes or information conduits over a given space decreases with distance from the interesting node 11, 208.

For example, in the rectangle around the interesting node 11, 208, surrounding nodes 1-5, 10-12, 14, 19-23, 28, 30, 32 and 37-41 lie within the fourth variable resolution communication structure. Only nodes 13, 29 and 31 within the rectangle are not members of the fourth variable resolution communication structure. The high density of nodes carrying the interesting information means the information moves quickly between nodes close to the interesting node 11, 208.

The query initiating node 71, 207 lies much farther away. At this more distant point within the network, the density of the fourth variable resolution communication structure is much lower. For example, only nodes around the edge of the rectangle around the query initiating node 71, 207 are part of the fourth variable resolution communication structure. Thus, query initiating node 71, 207 receives the information via mediating nodes that provide access to the surrounding information conduits.

Nodes 53 and 62 provide or mediate connectivity of node 71, 207 to node 44 within the fourth variable resolution communication structure. Alternatively, nodes 69 and 70 can provide or mediate connectivity of node 71, 207 to node 68 within the fourth variable resolution communication structure. Nodes at progressively further distances from the interesting node 11, 208 are provided with less direct access which conserves network resources.

Figure 12:
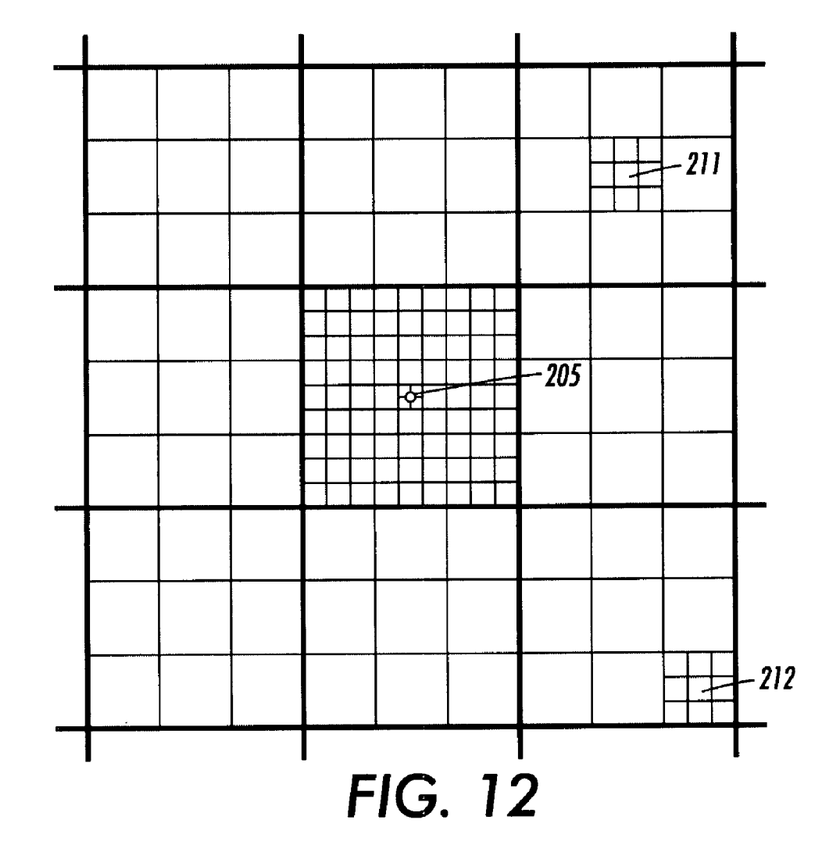
FIG. 12 is an overview of multiple variable resolution communication structures active within a network according to this invention.

FIG. 12 is an overview of multiple variable resolution communication structures active within a network according to this invention. Each variable resolution communication structure is associated with an interesting node within the network.

A fifth interesting node 205 is surrounded by a fifth or grid-based variable resolution communication structure. The high density lattice of conduits in the fifth variable resolution communication structure provide a means to quickly share interesting information among nodes close to the fifth interesting node 205. The density of the fifth variable resolution communication structure decreases with distance from the fifth interesting node 205. The sixth interesting node 211 is surrounded by a sixth variable resolution communication structure. The density of the sixth variable communication structure drops more quickly. It will be apparent that different types and/or densities of variable resolution communication structure may be activated based on the interesting node, a characteristic associated with an interesting node or various other factors associated with the node, the query, network demand or the like. The reduced density is indicated by the empty rectangles surrounding the rectangle containing the sixth interesting node 211.

The third interesting node 212 is similarly surrounded by a seventh variable resolution communication structure. The density of the seventh variable resolution communication structure also falls rapidly with distance from the third interesting node 212.

Thus, nodes at more distal locations access the information via a less dense set of conduits. This allows information to be shared quickly with immediately adjacent nodes while providing some bounding of query response time over the network. This is achieved without unduly impacting bandwidth, power or other constraints in the network.

Figure 13:
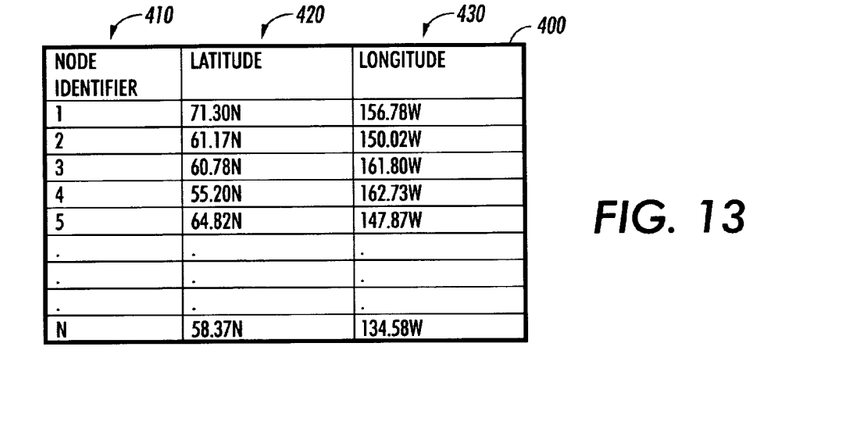
FIG. 13 is an exemplary data structure for storing spatial information according to this invention.

FIG. 13 is an exemplary data structure for storing spatial information according to this invention. The data structure for storing spatial information 300 is comprised of a node identifier portion 410; a latitude portion 420; and a longitude portion 430.

The first row of the exemplary data structure for storing spatial information contains the values "1" in the node identifier portion 410. This value uniquely identifies the node within the network. The latitude portion 420 contains the value "71.30N" indicating a latitude co-ordinate of node "1" in the northern hemisphere. The longitude portion 430 contains the value "156.78W" indicating the longitude of node "1".

The second row of the exemplary data structure for storing spatial information contains the value "2" in the node identifier portion 410. The latitude portion 410 contains the value "61.17N". The "150.02W" value in the latitude portion 430 locates the node on the intersection of these two great circles.

The third row of the exemplary data structure for storing spatial information contains a value of "3" in the node identifier portion 410 and values of "60.78N" and "161.80W" in the latitude and longitude portions 420-430.

The fourth row contains the values "4", "55.20N" and "162.73W". These values indicate the fourth node is located at latitude "55.20N" and longitude "162.73W". The fifth row contains the values "5", "64.82N" and "147.87W" indicating the fifth node is located at latitude "64.82N" and longitude "147.87W". The last row contains the values "N", "58.37N" and "134.58W" indicating the last node is located at latitude "58.37N" and longitude "134.58W".

Figure 14:
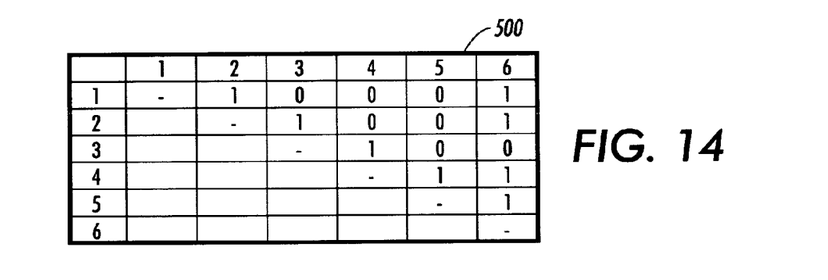
FIG. 14 is an exemplary data structure for storing communication link information according to this invention.

FIG. 14 is an exemplary data structure for storing communication link information according to this invention. Each row in the data structure for storing communication link information is associated with communication links between the element or node labeling the row and the element or node labeling each marked column. In this example, the links are bi-directional or full duplex links. Thus only the top half of the matrix records communication link information.

The first row contains marks indicating that communication links exist between element or node 1 and element 2 and element or node 1 and element 6. The communication link may be a wireless communication link or a wired or wire-line communication link.

The second row contains marks indicating communication links exist between elements 2-3 and 2-6. The third row contains marked indicating communications links between elements 3 and 4. The fourth row indicates communication links between elements 4-5 and elements 4-6. The fifth row contains marks indicating links exist between nodes 5 and 6.

Figure 15:
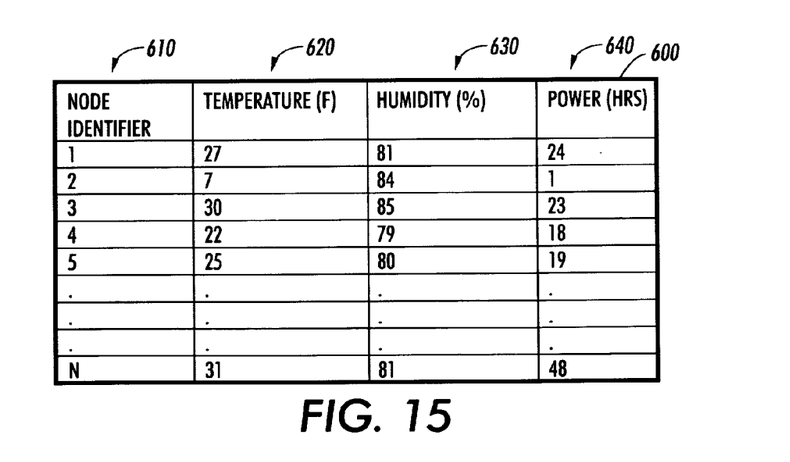
FIG. 15 is an exemplary data structure for storing variable resolution communication structure communication link information according to this invention.

FIG. 15 is an exemplary data structure for storing variable resolution communication structure communication link information according to this invention. The exemplary data structure for storing variable resolution communication structure communication link information 600 is comprised of a node identifier portion 610; a temperature portion 620; a humidity portion 630; and a power portion 640.

The first row contains the value "1" in the node identifier portion 610. This value identifies the node within the network of nodes. The "27" value in the temperature portion 620 indicates temperature sensed by the node in degree Fahrenheit. The node can become an interesting node based on sensed values such as temperature, humidity, power, location and/or various other criteria at discrete times or over time periods or temporal ranges.

The value "81" in the humidity portion 630 indicates the percent humidity sensed by the first node. The "24" value in the power portion 640 indicates the estimated power available to power the node in hours. It should be apparent that these values are exemplary and other values and/or types of information may used in the practice of this invention.

In the various embodiments of the system for structured variable resolution information dissemination and discovery 100, each of the circuits 540 outlined above can be implemented as portions of a suitably programmed general-purpose computer. Alternatively, 5-40 of the system for structured variable resolution information dissemination and discovery 100 outlined above can be implemented as physically distinct hardware circuits within an ASIC, or using a FPGA, a PDL, a PLA or a PAL, or using discrete logic elements or discrete circuit elements. The particular form each of the circuits 5-40 of the system for structured variable resolution information dissemination and discovery 100 outlined above will take is a design choice and will be obvious and predictable to those skilled in the art.

Moreover, the system for structured variable resolution information dissemination and discovery 100 and/or each of the various circuits discussed above can each be implemented as software routines, managers or objects executing on a programmed general purpose computer, a special purpose computer, a microprocessor or the like. In this case, the system for structured variable resolution information dissemination and discovery 100 and/or each of the various circuits discussed above can each be implemented as one or more routines embedded in the communications network, as a resource residing on a server, or the like. The system for system for structured variable resolution information dissemination and discovery 100 and the various circuits discussed above can also be implemented by physically incorporating the system for structured variable resolution information dissemination and discovery 100 into software and hardware system, such as the hardware and software systems of a web server or a client device.

As shown in FIG. 4, memory 15 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIG. 4, can each be any known or later developed device or system for connecting a communication device to the system for structured variable resolution information dissemination and discovery 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method for structured variable resolution information dissemination and discovery comprising the steps of:
    identifying a plurality of nodes;
    retrieving spatial information for the plurality of nodes;
    selecting an interesting node in the plurality of nodes;
    creating a variable resolution communication structure for the interesting node, wherein the variable resolution communication structure comprises conduit nodes and non conduit nodes, wherein the variable resolution communication structure reduces spatial density of the conduit nodes as the distance between the interesting node and the conduit nodes increases, and wherein information is propagated from the interesting node to at least one non conduit node via a series of conduit; and
    creating communications links between the interesting node and the other nodes based on the variable resolution communication structure, the spatial information associated with the other nodes, and the spatial information associated with the interesting node.

2. The method of claim 1, in which the spatial density's relationship with the location's distance from the interesting node is one of: an inverse relationship, a quadratic relationship, or an exponential relationship.

3. The method of claim 1, in which the variable resolution communication structure is defined by at least one of: a formula and a map.

4. The method of claim 1, in which the variable resolution communication structure is comprised of at least one of: a grid, circles, spirals and polygons.

5. The method of claim 4, in which the variable resolution communication structure is determined dynamically.

6. The method of claim 1, in which the communications links are at least one of: wired, wireless and encrypted.

7. The method of claim 1, in which the plurality of nodes form at least one of: an ad-hoc network, a mobile ad-hoc network, a fixed network and a mixed ad-hoc-fixed network.

8. A system for structured variable resolution information dissemination and discovery comprising:
    an input/output circuit for identifying a plurality of nodes;
    a spatial information circuit that determines spatial information for the plurality of nodes;
    an interesting node circuit that determines an interesting node in the plurality of nodes;
    a structure determining circuit that determines a variable resolution communication structure for the interesting node, wherein the variable resolution communication structure comprises conduit nodes and non conduit nodes, wherein the variable resolution communication structure reduces spatial density of the conduit nodes as the distance between the interesting node and the conduit nodes increases, and wherein information is propagated from the interesting node to at least one non-conduit node via a series of conduit nodes;
    a communications link circuit that creates communications links between the interesting node and the other nodes based on the variable resolution communication structure, the spatial information associated with the other nodes, and the spatial information associated with the interesting node.

9. The system of claim 8, in which the spatial density's relationship with the location's distance from the interesting node is one of: an inverse relationship, a quadratic relationship, or an exponential relationship.

10. The system of claim 8, in which the variable resolution communication structure is defined by at least one of: a formula and a map.

11. The system of claim 8, in which the variable resolution communication structure is comprised of at least one of: a grid, circles, spirals and polygons.

12. The system of claim 11, in which the variable resolution communication structure is determined dynamically.

13. The system of claim 8, in which the communications links are at least one of: wired, wireless and encrypted.

14. The system of claim 8, in which the plurality of nodes form at least one of: an ad-hoc network, a mobile ad-hoc network, a fixed network and a mixed ad-hoc-fixed network.

15. A computer readable storage medium comprising computer readable program code stored on the computer readable storage medium, the computer readable program code useable to program a computer for structured variable resolution information dissemination and discovery comprising the steps of:

identifying a plurality of nodes;
retrieving spatial information for the plurality of nodes;
selecting an interesting node in the plurality of nodes;
creating a variable resolution communication structure for the interesting node, wherein the variable resolution communication structure comprises conduit nodes and non conduit nodes, wherein the variable resolution communication structure reduces spatial density of the conduit nodes as the distance between the interesting node and the conduit nodes increases, and wherein information is propagated from the interesting node to at least one non conduit node via a series of conduit nodes; and
creating communications links between the interesting node and the other nodes based on the variable resolution communication structure, the spatial information associated with the other nodes, and the spatial information associated with the interesting node.

16. The computer readable storage medium of claim 15, in which the spatial density's relationship with the location's distance from the interesting node is one of: an inverse relationship, a quadratic relationship, or an exponential relationship.

17. The computer readable storage medium of claim 15, in which the variable resolution communication structure is defined by at least one of: a formula and a map.

18. The computer readable storage medium of claim 15, in which the variable resolution communication structure is comprised of at least one of: a grid, circles, spirals and polygons.

19. The computer readable storage medium of claim 18, in which the variable resolution communication structure is determined dynamically.

20. The computer readable storage medium of claim 15, in which the plurality of nodes form at least one of: an ad-hoc network, a mobile ad-hoc network, a fixed network and a mixed ad-hoc-fixed network.

* * * * *